May 24, 1955 M. E. ROTH 2,709,054
AIRBRAKE
Filed Dec. 30, 1952 3 Sheets-Sheet 1
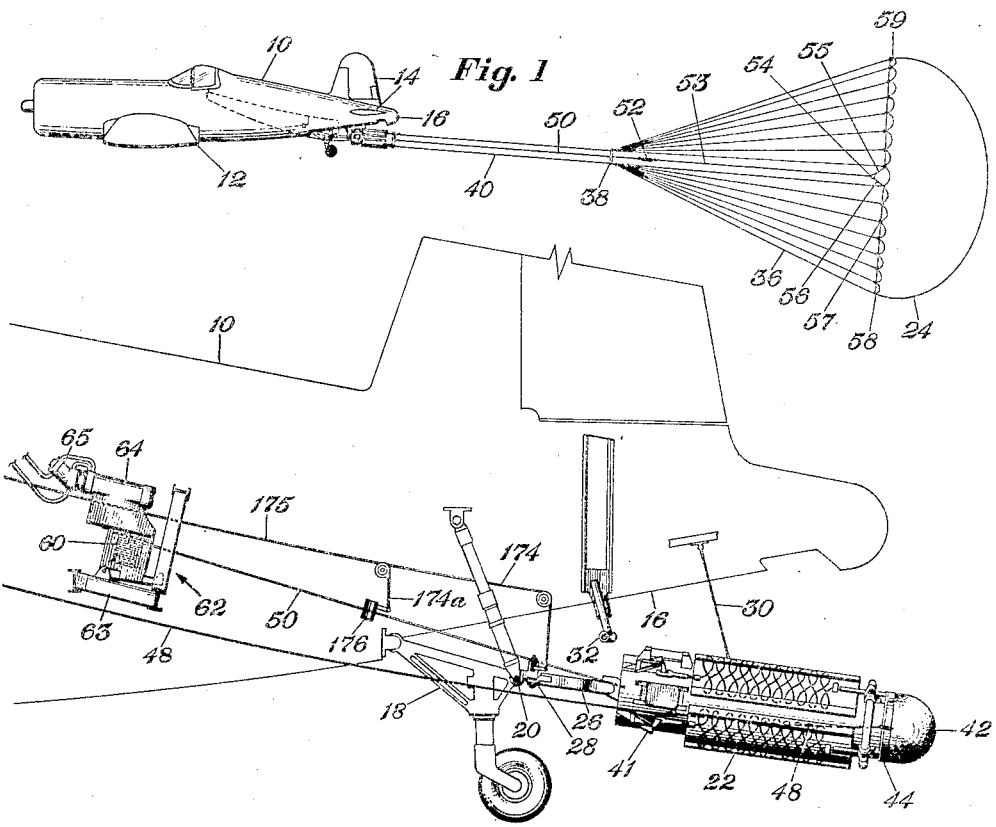
Fig. 1
Fig. 2
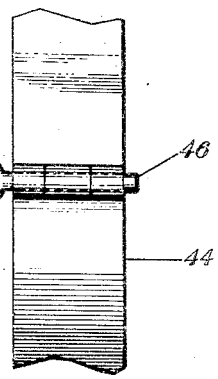
Fig. 3
INVENTOR.
Morris E. Roth
BY
W. R. Robertson
Agent May 24, 1955

M. E. ROTH 2,709,054

AIRBRAKE

Filed Dec. 30, 1952

INVENTOR.
Morris E. Roth

BY
W. R. Robertson
Agent

May 24, 1955  M. E. ROTH  2,709,054
AIRBRAKE
Filed Dec. 30, 1952  3 Sheets-Sheet 3

INVENTOR.
Morris E. Roth
BY
W. R. Robertson
Agent

United States Patent Office 2,709,054
Patented May 24, 1955

2,709,054

AIRBRAKE

Morris E. Roth, Dallas, Tex., assignor, by mesne assignments, to Chance Vought Aircraft, Incorporated, a corporation of Delaware Application December 30, 1952, Serial No. 328,594

6 Claims. (Cl. 244—113)

This invention relates to improvements in speed retarding mechanism of the parachute type for aircraft and has particular reference to an airbrake which is both reefable and jettisonable and to mechanism for governing drag loads.

It is an object of this invention to provide a speed retarding device for high performance aircraft by extending a parachute from the airplane, the parachute being jettisonable at the will of the pilot.

It is a further object of this invention to provide a parachute type airbrake which is automatically reefed and disreefed to prevent excessive drag loads on the airplane.

Another object of the invention is to provide an improved and simplified mechanism which permits extension and reefing of a parachute type airbrake and also permits instantaneous jettisoning of the parachute from the airplane.

Still another object of the invention is to provide an airbrake having a load sensing link which prevents excessive drag loads on the airplane.

Yet another object is the provision of a load sensing mechanism to govern drag loads and maintain them within predetermined limits.

The present invention provides an airbrake of the parachute type designed to quickly decelerate an airplane in flight sufficiently to permit safe bail-out by the pilot in case of emergency or to aid in recovery of the airplane from spins to a controllable attitude. Another purpose of the invention is to aid in decelerating an airplane when landing on small fields or to decelerate a fighter airplane from high speed to permit it to be a stable slower-speed platform from which to fire its weapons. Mechanism is included to govern the drag loads between an airplane or other vehicle and a towed object such as the parachute airbrake. Mechanism is also included to jettison the parachute or towed object when such action is necessary.

Other objects and advantages will be apparent from the specification and claims, and from the accompanying drawings which illustrate an embodiment of the invention.

In the present novel concept a parachute type airbrake is provided to be released on cables from the airplane at the will of the pilot. A winch is provided in the airplane to reef and dis-reef the parachute through a purse-string line around the circumference of the parachute. In order not to impair the structural integrity of the airplane, a load-sensing link is interposed between the parachute and the aircraft structure. By controlling the winch, and thus reefing or dis-reefing the parachute, through contact switches, this load-sensing link automatically prevents the drag loads imposed by the parachute on the airplane from exceeding a predetermined value. A jettisoning mechanism is provided for separating the parachute mechanism from the airplane with means simultaneously operated for severing the reefing line.

In the drawings,

Fig. 1 is an elevational view of an airplane with the parachute type airbrake in the extended fully dis-reefed position;

Fig. 2 is a side elevation, partly in section, of the aft portion of an airplane showing the parachute container, winch and associated parts installed thereon;

Fig. 3 is an elevational view of the pin-release and spring bands for retaining and releasing the pilot parachute;

Figure 4:
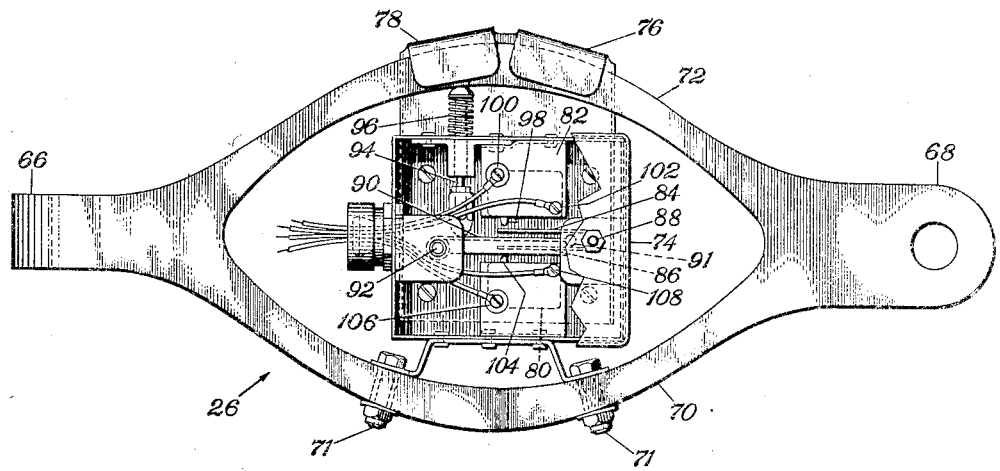
Fig. 4 is a plan view of the load-sensing link including the arrangement of the contact switches.

Referring to Figs. 1 and 2, the parachute airbrake is utilized on a conventional airplane having a fuselage 10, wing surfaces 12 and an empennage 14. The parachute airbrake mechanism, except for the winch, is mounted beneath the tail cone section 16 of the airplane and is pivotally connected to the tail wheel linkage assembly 18 by a bolt 20. The airbrake mechanism consists of a parachute container 22, in which a conventional parachute 24 is normally stored. Interposed between the container 22 and pivotal connection 20 is a load-sensing link 26 and an emergency release link 28 both of which will be hereinafter more fully described. Container 22 is limited in its downward pivotation by a tether line 30 attached at one end to the structure of airplane tail cone section 16 and at its other end to container 22. A bumper bar 32 rigidly attached to structural framework of tail cone section 16 and positioned above container 22 or its linkage prevents the container from striking against the aft section of the fuselage tail cone section during flight.

Parachute 24 is nuormally encased in container 22. The usual parachute suspension lines 36 are each attached to the circumference of the parachute 24 at one end and collected in four groups at their other ends, each group of which is attached to a collector ring 38 which in turn, is attached by four cables 40 to an adapter ring 41 at the forward end of container 22. Prior to extension of the parachute 24, cables 40 are stowed in coiled or figure "3" convolutions along the side of container 22. A pilot chute 42 is attached to parachute 24 and forms the end cover of container 22 to which it is secured by a flexible metal spring band 44 clamped over the end of container 22 and trapping the end cover pilot chute 42 between the container 22 and the band 44. As seen in Fig. 3, the ends of band 44 are locked together by a hinge type joint secured with a pin 46 to which is secured a pin withdrawing lanyard 48. It can be seen that when lanyard 48 pulls pin 46 releasing spring metal band 44, the pilot chute 42 will catch the air and pull parachute 24 from container 22 at which time parachute 24 will billow and assume its fully extended position as shown in Fig. 1.

Parachute 24 may be extended or contracted in circumference, i. e., dis-reefed or reefed, by a reefing line 50 which separates at junction 52 into two lines 53 leading to the periphery of the parachute 24. Each of lines 53 further separates at junction blocks 54 into purse-string lines 55 and 56 which pass freely through rings 57 attached to the hem of the parachute and the ends of lines 55 and 56 are secured to the hem of the parachute at points 58 and 59 respectively 90° from the first point of contact with parachute rings 57. It can thus be seen that, after parachute 24 is in extended position, a pull towards airplane 10 on reefing line 50 will, by a "purse draw string" effect by lines 55 and 56, reduce the circumference of the parachute to provide less drag, while extension of line 50 aft from the airplane will allow the parachute to assume a greater circumference to create a greater drag effect.

Junction 52 is designed as a shear bolt attachment so that normal reefing line loads are carried by it but the shear junction 52 would separate under higher impact load.

Reefing line 50 passes through container 22 and forward into the fuselage of airplane 10 where its end is wound around a drum 60 of a winch 62 securely mounted on aircraft structural member 63. Winch 62 is driven by a reversible hydraulic motor 64, the movement and direction of rotation being controlled by a solenoid operated valve 65 which governs the flow of hydraulic fluid to the motor. As explained in more detail hereinafter, motor 64 is controlled by the automatic load-sensing link 26.

The function of the load-sensing link 26 is to provide within relatively small limits a constant drag load on the airplane by the parachute 24. As seen in Fig. 4, load-sensing link 26 is of a double wishbone or closed end elliptical spring type, having end lugs 66 and 68 and separated arms 70 and 72. Mounted on arm 70 by fastenings 71 is a switch box 74 having casing extension lugs 76 and 78 extending up and over arm 72 to permit relative movement of arm 72 to box 74. Two contact switches 80 and 82, having normally open circuits under optimum drag loads, are mounted in box 74 on opposite sides of a pair of actuator levers 84 and 86 which are joined at their one end to form a U-shape and pivotally mounted at their confluence to the switch box casing at 88. Between actuator levers 84 and 86 is a spring leaf arm 90 fastened to the casing of switch box 74 at point 92 remote from point 88. The other end of arm 90 terminates in a bulbous or ball end 91 bearing against levers 84 and 86. A plunger 94 extends through the switch box casing on the side nearest arm 72 against which its outer end is biased by spring 96. The inner end of plunger 94 is adapted to contact arm 90. In its pre-loaded position spring arm 90 is so mounted that its bulbous end 91 will bear upwardly against lever 84 the free end of which will in turn bear against button 98 of contact switch 82 thus closing the circuit between terminals 100 and 102 and thus, if the parachute 24 is extended for automatic load operation, sending a signal to the solenoid valve 65 to direct the flow of hydraulic fluid to motor 64 so that it will unwind winch drum 60 to pay out cable 50, thus dis-reefing the parachute.

When arms 70 and 72 are under load imposed by the parachute drag they will deflect towards each other, depressing plunger 94 against spring arm 90 which in turn moves actuator levers 84 and 86 away from contact switch 82 and toward contact switch 80. At the optimum drag load the deflection of arms 70 and 72 will be just sufficient to maintain actuator levers 84 and 86 centrally between contact switches 80 and 82 in which case both micro-switch circuits would be open and no signal would be sent to the solenoid valve which would then maintain closed hydraulic circuits acting as a brake on the motor 64 and drum 60. When the parachute drag loads exceed the optimum value the deflection of arms 70 and 72 towards each other will be great enough to depress plunger 94 to the extent where it will depress arm 90 and actuator levers 84 and 86 downwardly until the end of lever 86 will depress button 104 of contact switch 80 to close the circuit between terminals 106 and 108 thus sending a signal to solenoid valve 65 to direct hydraulic pressure fluid to motor 64 to wind cable 50 on drum 60 thus reefing parachute 24 to reduce the drag load. It will be noted that the construction of the plunger and levers is such as to form an amplifying linkage where a very small movement of plunger 94 is multiplied by the long moment arm of plunger 94 acting near the fixed end of arm 90 and that moment is again multiplied by the long moment arm of bulbous end 91 acting on levers 84 and 86 near their pivoted end 88. Thus, a small movement of plunger 94 will result in a considerably greater movement of lever 86 against button 104 of contact switch 80.

Figure 8:
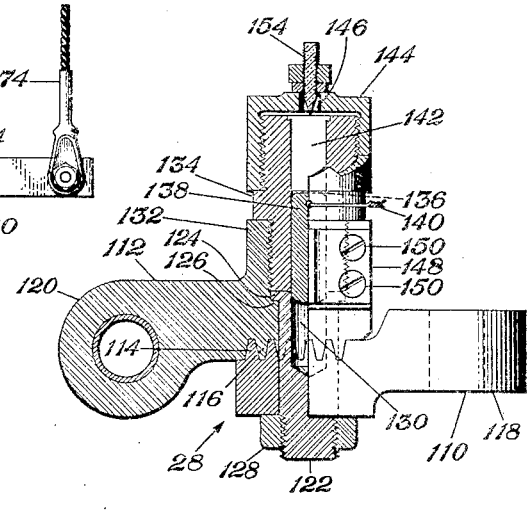
Fig. 8 is a side elevation of the emergency jettisoning link of Fig. 7, partly in section.

In the event of an emergency, provision is made for jettisoning the entire parachute and mechanism by an explosive, frangible release link operated through a simple lever by the pilot. To accomplish jettisoning the special release link coupling 28 is installed between the load sensing unit 26 and aircraft structure. As seen in Fig. 8, link 28 is comprised of two portions 110 and 112 having mating rack-like teeth 114 and 116 and apertured lugs 118 and 120 respectively. One of the lugs is fastened by a bolt or other suitable means to load-sensing unit 26 while the other lug is similarly secured to the aircraft tail wheel linkage structure 18 by a bolt indicated at 20 in Fig. 1. The rack-like parts or portions 110 and 112 are centrally bored to receive a bolt 122 having a lip 124 which rests on a shoulder 126 of portion 112. The end of bolt 122 extending beyond portion 118 is threaded to receive nut 128 to secure the portions to each other. The internal end of bolt 122 is bored to form a recess 130 therein. An upwardly extending boss 132 on portion 112 is internally threaded to receive a member 134 which is centrally drilled to form a passage 136 which registers with recess 130 in bolt 122. A projectile 138 having a sliding fit is inserted in passage 136 and held in position over recess 130 by a shear wire 140 passed through suitable registering holes in the projectile and member 134. A blank cartridge 142 is inserted into the end of passage 136, the cartridge rim projecting over the edge of the passage 136. A cap 144 is threaded on the end of member 134 and has a central opening 146 over the firing cap of cartridge 142. A bracket 148 fastened to the side of boss 132 by studs 150 supports an upright member 152 on which is mounted a trigger mechanism including a firing pin 154 adapted to strike the firing portion of cartridge 142 through opening 146. Firing pin 154 is carried at one end of a hammer arm 156 the other end of which is pivotally connected to upright 152. Arm 156 is biased toward the position where firing pin 154 is in contact with cartridge 142 by a spring 158. A lever arm 160 is pivotally attached to upright 152 as at 162 and is biased to a perpendicular position thereto by spring 164. Lever 160 carries a pawl 166 one end of which is pivotally mounted thereon at 168 while its other end is adapted to ride in a recess 170 in the pivoted end of arm 156, to which position it is biased by spring 172. The free end of lever arm 160 is drilled to receive the shackle of a line 174 which extends through the fuselage of the airplane to connect with a lanyard 175 which goes to the airplane cockpit where it is connected to a lever (not shown) operable by the pilot to pull cable 174.

Figure 9:
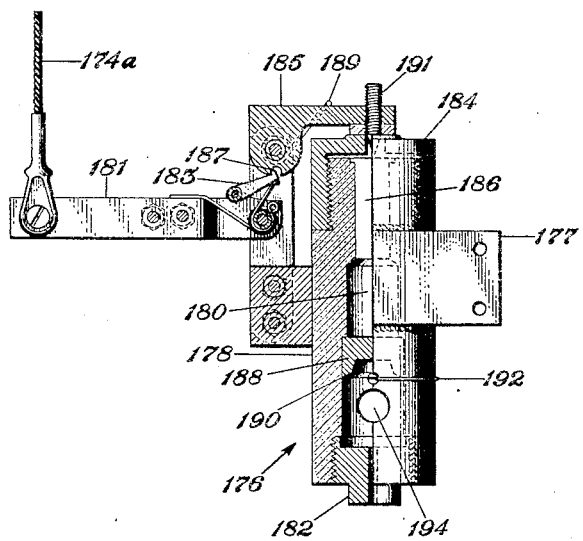
Fig. 9 is an elevational view of the reefing cable cutter used in the jettisoning operation.

An explosive type cutter mechanism 176 may be utilized to sever the reefing cable 50. As seen in Fig. 2, cutter 176 may be mounted on aircraft structure within the fuselage aft of winch 62, or at any other desired position, by suitable fastenings through flange 177 of a body member 178 (Fig. 9) which is suitably drilled to form a staggered chamber 180, closed at one end by plug 182 and at its other end by cap 184. Chamber 180 accommodates a cartridge 186 and a sliding projectile 188 having a cutting edge 190. Projectile 188 is positioned by a shear wire 192 which passes through holes in body member 178 below the cutting edge 190. Aperture 194 is drilled through both sides of body member 178 and reefing cable 50 passes through this aperture. A trigger mechanism similar to that described for link 28 is fastened to body 178, having an arm 181, a pawl 183, a hammer arm 185, a recess 187, a spring 189, a firing pin 191, and a lanyard 174a, the latter being connected to lanyard 175.

Figure 5:
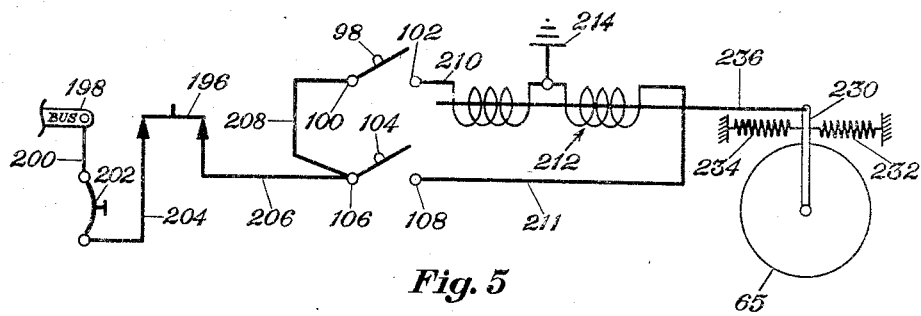
Fig. 5 is a diagram of the electrical circuit used in reefing and dis-reefing the parachute, including the hydraulic valve governed thereby.
Figure 6:
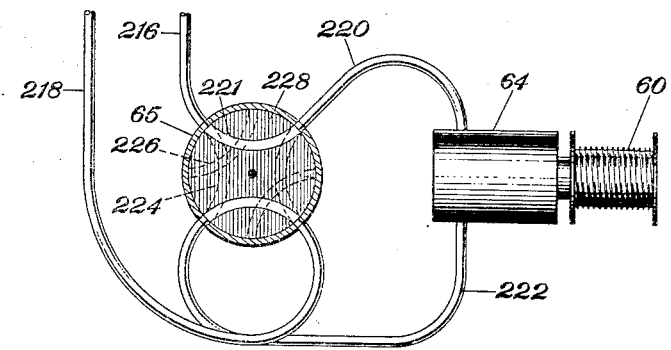
Fig. 6 is a sketch of the hydraulic conduit and the valve which controls the hydraulic winch motor.

Solenoid operated hydraulic valve 65 may be of a conventional type having a fluid pressure line 216 to a source of pressure fluid (not shown) and a passage line 218 for the return of fluid to a fluid reservoir (not shown). The valve 65 also has suitable ports and passages connected to hydraulic lines 220 and 222 one of which acts as a pressure line and the other as a return line to hydraulic winch motor 64 depending on the position of the valve. When valve 65 is positioned to connect pressure fluid line 216 to line 220, as shown by full lines 221 in Fig. 6, pressure fluid will be delivered to turn hydraulic motor 64 in one direction to unwind cable 50 from drum 60, the return fluid passing through line 222, valve 65 and line 218. When valve 65 is positioned to connect pressure line 216 to line 222, as shown by dotted lines 224, pressure fluid is supplied to turn motor 64 in the opposite direction to wind cable 50 onto drum 60 thus reefing parachute 24. A third neutral position of valve 65, shown by dotted lines 226 blocks the passage of hydraulic fluid in which case the trapped fluid in the lines and in motor 64 acts as a brake to prevent rotation of drum 60. The rotor 228 of valve 65 has an integral shaft extending externally of valve 65 to which is secured a lever arm 230 (Fig. 5). Opposed tension springs 232 and 234, one end of each being fastened to fixed aircraft structure and the other end secured to arm 230, serve to center arm 230 and thus maintain valve 65 in an inoperative or neutral condition as shown by dotted lines 226 in Fig. 6, when the springs are not overcome by the action of solenoid 212 as hereinafter described.

In operation, the pilot closes switch 196 (Fig. 5) to the automatic position and then pulls lanyard 48 to remove pin 46 releasing spring band 44 and allowing the end cover pilot chute 42 to catch the air stream and pull parachute 24 and its cables 40 and reefing cable 50 from container 22. As soon as parachute 24 billows it exerts a drag force to decelerate the airplane. If the drag load is less than the predetermined optimum load, the arms 70 and 72 will not be deflected towards each other sufficiently to depress plunger 96 to move lever arm 84 from its pre-loaded position where it depresses contact switch button 98, in which position the circuit between terminals 100 and 102 is closed thus connecting one side of solenoid 212 to bus 198 through conductor 200, circuit breaker 202, conductor 204, switch 196, conductor 206, conductor 208, switch 98 and conductor 210, the circuit between terminals 106 and 108 being open. Solenoid 212 is grounded at 214. The energizing of solenoid 212 through conductor 210 moves solenoid rod 236 to the right (Fig. 5) to overcome the tension on centering springs 232 and 234 to move lever arm 230, to the end of which rod 236 is pivotally secured, in a clockwise direction to open valve 65 to the position shown by full lines 221 in Fig. 6. In this position valve 65 allows pressure fluid from line 216 to line 220 to hydraulic motor 64 driving motor 64 in a direction to rotate drum 60 to unwind reefing cable 50 and thus disreef parachute 24 thereby increasing the drag load on the airplane. The return fluid passes through line 222 through valve 65 and through line 218 to the fluid reservoir.

Similarly, a drag load in excess of optimum will deflect arms 70 and 72 of the load sensing link unit 26 towards each other depressing plunger 96 to depress contact switch button 104, through levers 90 and 86, thus opening the circuit through terminal 100, switch 98 and terminal 102 and closing the circuit between terminal 106, switch 104, terminal 108 and conductor 211 to solenoid 212 causing rod 236 to move to the left (Fig. 5). Rod 236 then pivots lever arm 230 in a counterclockwise direction to move valve 65 to the position shown by dotted lines 224 in Fig. 6 where pressure line 216 is connected to line 222 to give reverse direction to motor 64 thereby winding cable 50 on drum 60 to reef parachute 24 and reduce the parachute drag load.

As explained above, when the drag load is at the predetermined optimum value, the deflection of arms 70 and 72 of the load sensing unit will be sufficient to partly depress plunger 96 to a position where neither levers 84 or 86 are depressing switch buttons 98 or 104. In that condition solenoid 212 will not be energized and centering springs 232 and 234 will maintain valve 65 in a neutral position and the blocked hydraulic fluid will act as a brake preventing rotation of drum 60.

It will be understood that instead of controlling the reefing or dis-reefing of the parachute, the load sensing mechanism could be used to govern loads on the tow cables 40 to compensate for heavy intermittent gust loads. In that manner the mechanism could also be used to compensate for sudden loads on tow cables between tow tugs and tow barges or the like where tow cables are subject to sudden heavy strains or slackening. In that usage, the tow cable 40 would necessarily be attached directly to a winch drum such as 60 and the load sensing unit 26 would be interposed in and form a part of the cable 40, where, under higher than optimum loads it could cause the winch to unwind the cable 40 from drum 60 and under lower than optimum loads it could cause the winch to wind cable onto drum 60 thereby maintaining a substantially constant drag load on the cable.

Figure 7:
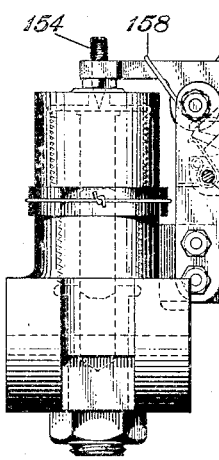
Fig. 7 is a view in front elevation of the emergency jettisoning link for jettisoning the parachute.

To effectuate jettisoning of the parachute assembly the pilot pulls on lanyard 175 which simultaneously pulls on lanyards 174 and 174a. The movement of arm 160 upwardly (Fig. 7) by lanyard 174 will cock hammer arm 156 until pawl 166 slips out of recess 170 at which time the action of spring 158 will bring hammer arm 156 sharply downwardly impinging firing pin 154 on cartridge 142. The firing of cartridge 142 forces projectile 138 downwardly in recess 136, shearing shear wire 140, the impact of projectile 138 upon the bottom of recess 130 shearing lip 124 of bolt 122, thus fracturing the frangible link 28 by separating portion 110 from 112.

The upward pull on lanyard 174a pulls arm 181 upwardly cocking hammer arm 185 until pawl 183 leaves recess 187, the spring 189 forcing hammer arm 185 and firing pin 191 downwardly to fire cartridge 186. The explosive force of cartridge 186 forces projectile 188 downwardly in recess 180, the cutting edge 190 shearing the shear wire 192 and the reefing cable 50.

The simultaneous separation of link 28 and shearing of cable 50 allows the parachute 24 with cables 40 and the free end of sheared reefing cable 50, container 22, load sensing link 26, and portion 110 of link 28 to fall free of the airplane, breaking tethering line 30.

As a result of this invention, it is evident that mechanism has been provided whereby the speed of high performance aircraft can be reduced considerably at the will of the pilot within a brief period of time. Also, that mechanism has been included to maintain a constant predetermined drag load during such speed reduction.

Further, as a result of this invention, a parachute type of airbrake mechanism has been provided whereby the parachute can be jettisoned instantaneously should flight conditions demand such action.

While only one embodiment of the invention has been shown in the accompanying drawings, it will be evident that various modifications are possible in the arrangement and construction of the airbrake components without departing from the scope of the invention.

I claim:

1. In a piloted aircraft, an airbrake comprising a container, a hollow frangible link attaching said container to said aircraft, a parachute normally housed within said container, cable connections between said parachute and said container, pilot operated means for extending said parachute from its normal position in said container to an extended position for exerting a drag load on said aircraft, an explosive cartridge incorporated within said frangible link, and pilot operated firing mechanism for exploding said cartridge to fracture said frangible link whereby said parachute and said container are jettisoned from said aircraft.

2. In combination with a piloted aircraft, a jettisonable speed-retarding mechanism comprising, a container, a hollow frangible link connecting said container to said aircraft, a parachute normally housed in an inoperative position within said container, cable means connecting said parachute to said container, pilot operated means for extending said parachute from its inoperative position to an extended billowed position for exerting a drag load on said airplane, means for reefing and disreefing said parachute including a cable slidably associated with the periphery of said parachute to form a draw string and a winch mounted in said aircraft to which the free end of said reefing cable is connected for retracting and extending the same, and explosive means including an explosive cartridge housed within said frangible link and pilot-operated firing means to explode said cartridge for fracturing said frangible link whereby said parachute and said container are jettisoned from said aircraft.

3. A speed retarding device for a piloted aircraft comprising; a parachute normally housed in an inoperative position within said aircraft; cable means connecting said parachute to said aircraft; pilot operated means for extending said parachute from its inoperative position to an extended billowed position for exerting a drag load on said aircraft; and means for maintaining said drag load substantially constant including a reefing cable slidably associated with the periphery of said parachute to form a draw string for controlling the billowed circumference of said parachute, operating means for said reefing cable in said aircraft for extending and retracting said reefing cable from and into said aircraft, and load-sensing means in said cable means between said parachute and said aircraft adapted to govern said operating means to retract said reefing cable into said aircraft to reef said parachute when said drag load exceeds a predetermined load and to extend said reefing cable from said aircraft to disreef said parachute when said drag load is less than said predetermined load.

4. A speed retarding device for a piloted aircraft comprising, a container having an attachment to said aircraft, a parachute normally housed in an inoperative position within said container, cable means connecting said parachute to said container, pilot operated means for extending said parachute from its inoperative position to an extended billowed position for exerting a drag load on said aircraft, means for reefinig and disreefing said parachute including a draw string reefing cable slidably extending along the skirt of said parachute, a reversible winch in said airplane receiving the free end of said reefing cable and adapted to extend and retract the same to accomplish said reefing and disreefing, a closed end elliptical spring load-sensing link in said attachment between said container and said aircraft having two arms which deflect under load, means for measuring the deflection of said arms, and means for governing the extent of said drag load including an operative connection between said measuring means and said winch adapted to actuate said winch to retract said reefing cable to reef said parachute when said drag load exceeds a predetermined load and adapted to actuate said winch to extend said reefing cable to disreef said parachute when said drag load is less than said predetermined load.

5. A speed retarding device for a piloted aircraft comprising, a container; a hollow frangible coupling connecting said container to said aircraft; a parachute normally housed in an inoperative position within said container; cable means connecting said parachute to said container; pilot operated means for extending said parachute from its inoperative position to an extending billowed position for exerting a drag load on said aircraft; a reefing cable slidably associated with the periphery of said parachute to form a draw string for controlling the billowed circumference of said parachute when said reefing cable is extended and retracted from said aircraft; a reversible winch in said aircraft retaining the free end of said reefing cable; load-sensing means between said parachute and said container including a closed end elliptical spring having a pair of arms deflectible under load; means for maintaining said drag load substantially constant including load measuring means for measuring the deflection of said arms to determine the drag load, and an operative connection between said measuring means and said winch adapted to actuate said winch to retract said reefing cable to reef said parachute when said drag load exceeds a predetermined load and adapted to actuate said winch to extend said reefing cable to disreef said parachute when said drag load is less than said predetermined load; an explosive cartridge in said hollow coupling; and pilot operated firing means for exploding said cartridge to fracture said frangible coupling whereby said parachute and said container are jettisoned from said aircraft.

6. A load-sensing traction dynamometer comprising; a pair of deflectible arms having their ends connected to form a double yoke, connecting means at the ends of said yoke to receive a load on the same, a pair of contact switches mounted on one of said arms having contact buttons for opening and closing the circuits of said switches, a lever adapted to abut either of the contact buttons of said switches, and a plunger operatively abutting the other of said arms and having an operative connection with said lever to move the same into engagement with the contact button of one of said switches upon the deflection of said arms under load and to move said lever into engagement with the contact button of the other of said switches when said arms are not deflected.

References Cited in the file of this patent

UNITED STATES PATENTS

| 1,647,272 | Chatillon | Nov. 1, 1927 |
| 1,768,420 | Rogers | June 24, 1930 |
| 2,363,732 | Jenkins | Nov. 28, 1944 |
| 2,384,127 | Nailor | Sept. 4, 1945 |
| 2,443,028 | Edwards | June 8, 1948 |
| 2,460,194 | Schultz | Jan. 25, 1949 |
| 2,513,867 | Heffernan | July 4, 1950 |
| 2,520,923 | Franzel | Sept. 5, 1950 |
| 2,609,181 | Jaeschke | Sept. 2, 1952 |
| 2,626,117 | Heinrich | Jan. 20, 1953 |

FOREIGN PATENTS

| 323,703 | Great Britain | Jan. 9, 1930 |